(12) United States Patent  
Feda

(10) Patent No.: US 8,970,677 B2  
(45) Date of Patent: Mar. 3, 2015

(54) FOCUS ACTUATED VERGENCE

(75) Inventor: Francis M Feda, Sudbury, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1844 days.

(21) Appl. No.: 12/033,251

(22) Filed: Feb. 19, 2008

(65) Prior Publication Data

US 2009/0207236 A1 Aug. 20, 2009

(51) Int. Cl.
- H04N 13/02 (2006.01)
- H04N 5/262 (2006.01)
- H04N 5/232 (2006.01)
- H04N 13/00 (2006.01)

(52) U.S. Cl.
CPC ......... H04N 5/2628 (2013.01); H04N 5/23212 (2013.01); H04N 13/0022 (2013.01); H04N 13/0239 (2013.01); H04N 13/0296 (2013.01)
USPC .......................................................... 348/47

(58) Field of Classification Search
USPC .......................................................... 348/47
See application file for complete search history.

(56) References Cited

U.S. PATENT DOCUMENTS

| | | | | |
|---|---|---|---|---|
| 4,202,598 A | * | 5/1980 | Jenkins | 359/414 |
| 5,276,534 A | | 1/1994 | Mutze et al. | |
| 5,353,081 A | * | 10/1994 | Quattrini | 396/72 |
| 5,778,261 A | * | 7/1998 | Tanaka et al. | 396/55 |
| 5,883,662 A | | 3/1999 | Zanen | |
| 5,979,760 A | * | 11/1999 | Freyman et al. | 235/454 |
| 7,307,793 B2 | | 12/2007 | Ottney et al. | |
| 2003/0011692 A1 | * | 1/2003 | Shore et al. | 348/240.3 |
| 2003/0190072 A1 | | 10/2003 | Adkins et al. | |
| 2007/0235634 A1 | | 10/2007 | Ottney et al. | |

FOREIGN PATENT DOCUMENTS

| | | |
|---|---|---|
| EP | 1 085 769 A2 | 3/2001 |
| GB | 2 226 923 A | 7/1990 |

OTHER PUBLICATIONS

PCT Search Report dated Jul. 20, 2009 of Patent Application No. PCT/US09/00999 filed Feb. 18, 2009.
Supp EP Search Report, Jun. 8, 2011.
Honeywell, "Hall Effect Sensing and Application", Oct. 5, 2003, 126 pages.

* cited by examiner

*Primary Examiner* — John Macilwinen
(74) *Attorney, Agent, or Firm* — Maine Cernota & Rardin; Andrew P. Cernota

(57) ABSTRACT

A system for the vergence of images from a plurality of cameras, the system provides a first camera; a second camera disposed at some distance from that first camera; a focus adjustment whereby the focus of the first camera can be adjusted by a user; the focus adjustment being configured with a range finder whereby the distance from the first camera to a target is ascertained; a look up chart wherein divergence distance of images generated from the first camera from images of the second camera are provided for pre-calculated ranges; and a processor whereby the images generated by the first camera are superimposed on the images generated by the second camera by the divergence distance determined from the lookup.

13 Claims, 13 Drawing Sheets

Fig. 2
Object Space / Image Space Relationship
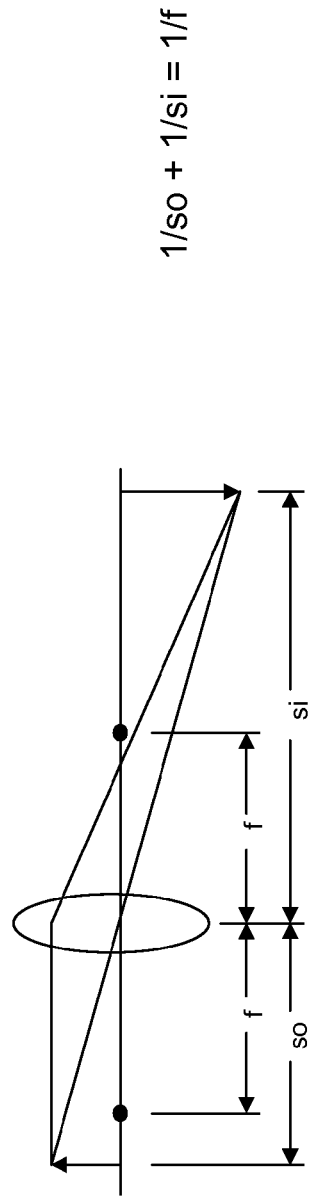
$1/so + 1/si = 1/f$
Depth of Field / Depth of Focus
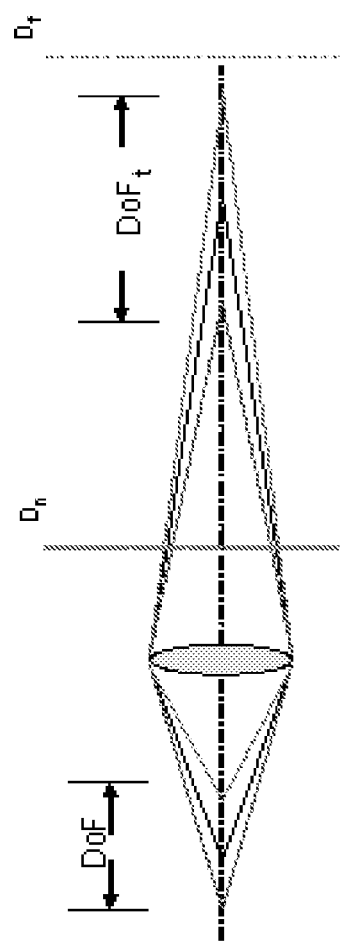

Fig 3 A
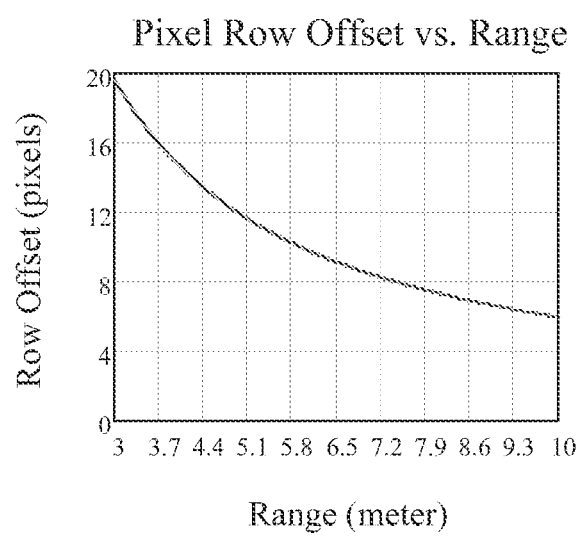
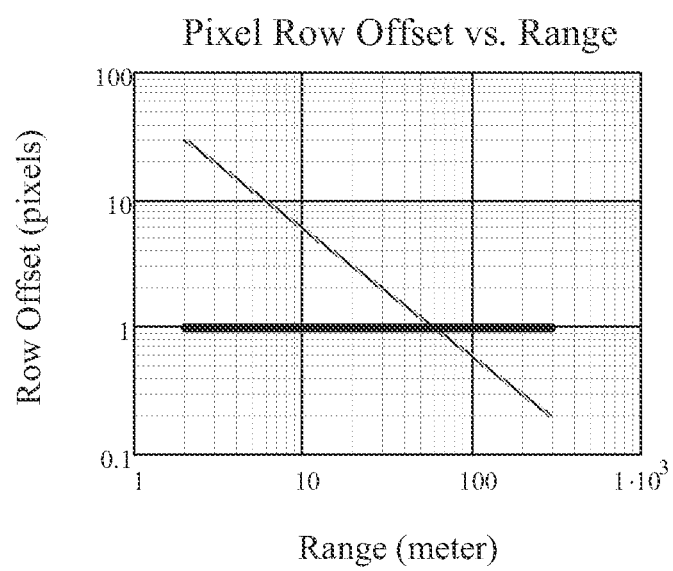
Fig 3 B

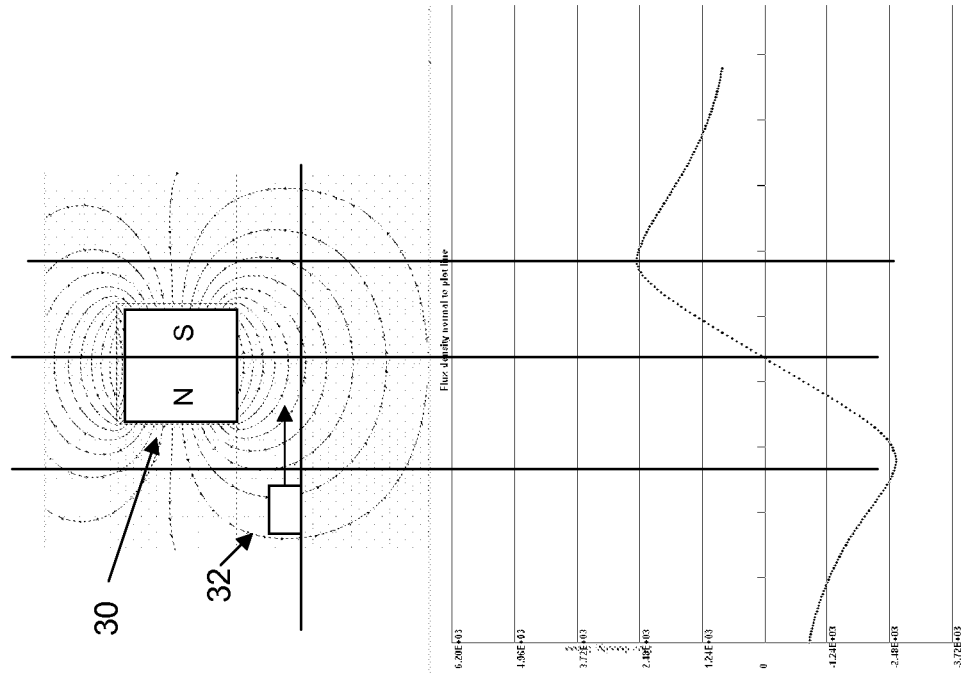
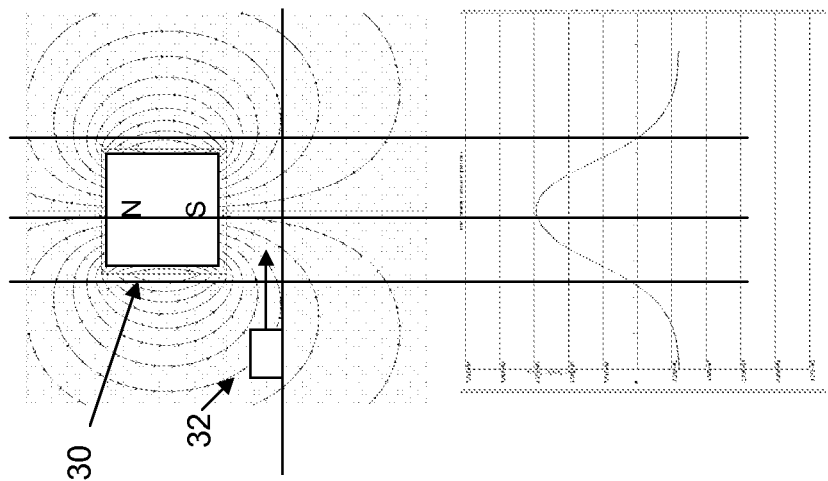

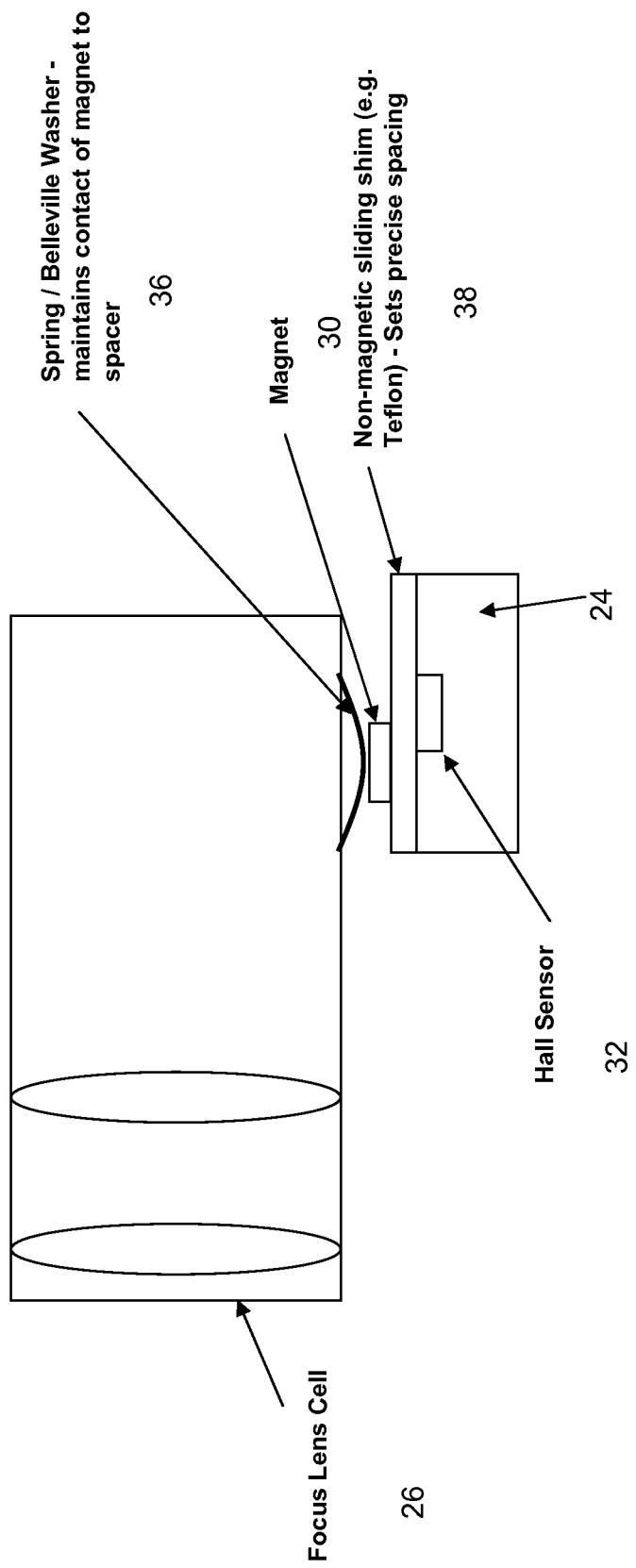

Fig. 9
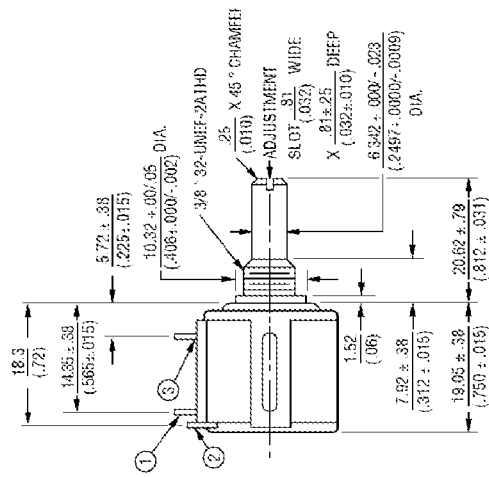
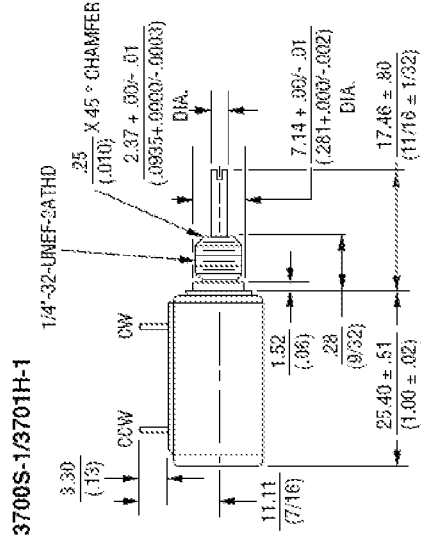

FOCUS ACTUATED VERGENCE

RELATED APPLICATIONS

Field of the Invention

The invention relates to parallax correction systems, and more particularly, to a system and method for correcting parallax in the overlap of images from a multiple camera array.

Background of the Invention

Night vision goggle systems are evolving to incorporate multiple imagers (cameras), such that the output video streams from each imager may be selectively fused into an output video stream. This video stream is then presented to the user, typically on a microdisplay as viewed through monocular optics. Alternative embodiments of this basic architecture are possible.

Typically each imager consists of a set of optics, a focal plane and associated processing electronics, with the optics being designed for optimum performance across the wavelength band to which the focal plane is sensitive.

Since the optical systems for each of the imagers are independent, the lines of sight of these imagers are offset from one another. This introduces parallax into the system, such that the imagery from each of the respective imagers in the goggle system is correspondingly offset from one another.

When images from different cameras are fused (i.e. superimposed), it is important that the two be pixel-registered. That is, the fields of view seen by pixels in each of the two images to be fused must correspond in order to avoid image separation; otherwise, dual images of the scene will be observed, offset by some number of pixels.

Because of parallax, image registration between cameras can be achieved only at one distance. At other distances, the imagery from one camera will be offset from that of the other on the focal plane and image separation will be observed on a fused image. For cameras that are offset from one another in the vertical axis, their respective imagery will also have a vertical offset and any image separation in a fused image will occur along the same axis.

This problem is not unlike that of boresighting a rifle sight to a gun. Since the sight sits above the gun, it must be angled slightly downward such that its line of sight crosses the path of the bullet at exactly the range where the target is located. If the target should move closer, the bullet would hit a point lower than where the sight was pointing, and vice versa (neglecting for this example other effects such as gravity and windage effects on the bullet).

A fundamental difference between rifle boresighting and imager parallax correction is that with respect to the latter, the lines of sight of the two optical systems are parallel and thus do not intersect at some range. Thus, there is always some offset between the images from the two cameras due to the physical separation of the optical axes. What is done is to electronically shift one image relative to the other such that the images are aligned properly at a specific range. This process is known as image registration.

Thus for cameras boresighted at a particular distance (the boresight distance), the imagery from these cameras will be registered only at that distance due to parallax effects. Image separation will be observed in a fused image should the object being viewed be at a distance different than the boresight distance.

Image processing is one approach that can perform image registration (also known as vergence) automatically. This is generally achieved in two steps by first determining (e.g. through cross-correlation of the two images) how far to shift one image to achieve pixel correspondence between the two images. Once the amount of shift between the two images is known, the second step involves electronically shifting one image to overlay the second such that a correctly registered fused image can be produced.

A disadvantage of this approach is that the added electronic image processing requires additional computation and consequently will consume additional electrical power. This undesirable in a lightweight, battery operated device. Most of the computational effort (and power consumption) is related to determining the amount of offset between the two images. In addition, due to changing environmental conditions there will be circumstances whereby the image contrast from one camera or the other may be inadequate to perform a good correlation. For example, on a very dark night, a visible camera may provide a dark, low contrast, barely useful image, while the thermal image may provide a bright, high contrast image. A cross-correlation may not work well in this case since the image quality would be poor in one of the images. So, automatic correlation fails in that case.

Another issue arising from such an approach is that, like auto-focus in conventional cameras, auto registration can only guess at what region of the image the user wants to correct for parallax, or operate in a predefined region of the image (e.g. the center).

A means to reduce this computational load, minimize the ill effects of varying environmental conditions affecting image quality, maintain the ability to perform the cross-correlation necessary to automatically align the two images, and still achieving vergence would be desirable as a way to reduce power consumption while achieving good image registration.

SUMMARY OF THE INVENTION

One embodiment of the present invention provides a system for the vergence of images from a plurality of cameras, the system comprising: a first camera; a second camera disposed at some distance from the first camera; a focus adjustment whereby the focus of the first camera can be adjusted by a user; the focus adjustment being configured with a lens position sensor whereby the position of the lens is measured; a comparator whereby the position of the lens is compared to known relationships between lens position and image shift and providing vergence data corresponding to the lens position and; a processor whereby the images generated by the first camera are superimposed on the images generated by the second camera and aligned by the vergence data.

Another embodiment of the present invention provides such a system wherein the focus adjustment comprises a focus dial whereby distance between a lens and a focal plane can be adjusted.

A further embodiment of the present invention provides such a system wherein the lens is disposed in a lens block slideably disposed within a lens housing.

Yet another embodiment of the present invention provides such a system wherein the lens housing comprises a position sensor mounted within the housing proximate to the lens block.

A yet further embodiment of the present invention provides such a system further comprising a magnet coupled to the lens block and wherein the position sensor is a Hall sensor.

Still another embodiment of the present invention provides such a system wherein the position sensor is a spring upon which a tension sensor is disposed.

A still further embodiment of the present invention provides such a system wherein the position sensor is a potentiometer.

Even another embodiment of the present invention provides such a system wherein the focus dial is provided with a potentiometer such that a wipe of the potentiometer is disposed on the dial and a resistive element of the potentiometer being disposed proximate to the focus dial fixed to a housing of the first camera.

One embodiment of the present invention provides a method for the focus actuated vergence of a plurality of images, the method comprising: measuring the distance from a lens of a first camera to a focal plane; comparing the distance to a lookup table for image parallax data for a plurality of the distances; using the image parallax data from the lookup chart to compensate for parallax error in superposition of images generated by the first and the second cameras.

Another embodiment of the present invention provides such a method further comprising compensating for velocity induced misregistration.

A further embodiment of the present invention provides such a method wherein the step of measuring the distance from the lens of the first focal plane further comprises using a sensor to determine the position of a lens block within a lens housing.

Yet another embodiment of the present invention provides such a method wherein the position of the lens block is directly measured by a Hall sensor and magnet pair.

Still another embodiment of the present invention provides such a method wherein the position of the lens block is determined by a reading of a potentiometer disposed in the lens housing.

A still further embodiment of the present invention provides such a method wherein the position of the lens block is determined by a tension meter disposed on a spring disposed between the lens block and a wall of the lens housing.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 2 is a block diagram illustrating a camera lens illustrating the relationship between focus position and range.

FIG. 3A is a graph illustrating a plot of pixel row offset vs. range configured in accordance with one embodiment of the present invention.

FIG. 3B is a graph illustrating a base 10 logarithmic plot of pixel row offset vs. range configured in accordance with one embodiment of the present invention.

FIG. 5A is a block diagram illustrating a camera focus block configured in accordance with one embodiment of the present invention with position sensor with a magnet positioned such that the axis of the magnet is perpendicular to the sensor.

FIG. 5B is a block diagram illustrating a camera focus block configured in accordance with one embodiment of the present invention with position sensor with a magnet positioned such that the axis of the magnet is parallel to the sensor.

FIG. 9 is a block diagram illustrating potentiometers for use in a camera focus adjustment configured in accordance with one embodiment of the present invention.

DETAILED DESCRIPTION

Figure 1:
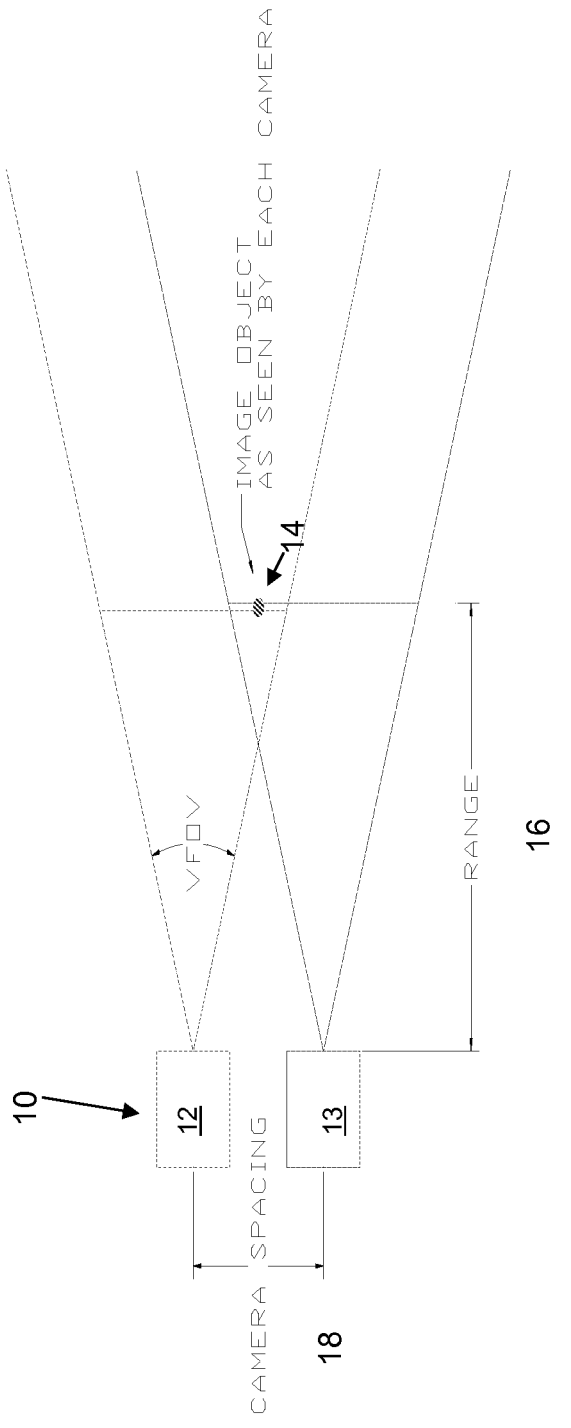
FIG. 1 is a block diagram illustrating a camera array having a parallax error and configured in accordance with one embodiment of the present invention.

As illustrated in FIG. 1, the amount of image offset between multiple cameras 12, 13 viewing an object 14 is dependent on the separation distance between the cameras 12, 13 and the range 16 to the object 14. Since the separation distance 18 is fixed by the mechanical assembly 10 which secures the cameras 12, 13, a relationship between image offset and range 14 can be established.

Goggle systems need the ability to achieve focus of both distant objects and those that are close in. Consequently, a focus adjustment control is typically provided to adjust the lens position to achieve optimum focus at a particular range. In effect, the lens position and equivalently the focus control setting serves as an indication of range since the focus setting will be unique for objects at a given distance.

One embodiment of the present invention is therefore provided with a method and apparatus for sensing the focus setting, or equivalently the lens position relative to the focal plane as an indication of range, and then to use this range estimate as a means to establish the amount of electronic image shift to introduce in order to achieve vergence between the imagery from the cameras. By relying on the focus setting instead of image processing techniques to determine the amount of image offset (and thus the image shift required), significant electronic processing is avoided with a corresponding decrease in overall system power consumption. In addition, the need for an independent, manual vergence control is eliminated, thereby simplifying the user interface.

Focus sensing can be accomplished in several ways. In one embodiment, switches are placed at selected locations along the range of focus adjustment or lens travel. As the focus control is adjusted, it will cause a particular switch to close. This switch closure is input to the electronics as an indication that the system is focused at a particular distance. The amount of image shift can then be determined, such as from a lookup table or similar approach, such as that illustrated in FIGS. 3A and 3B.

Figure 4:
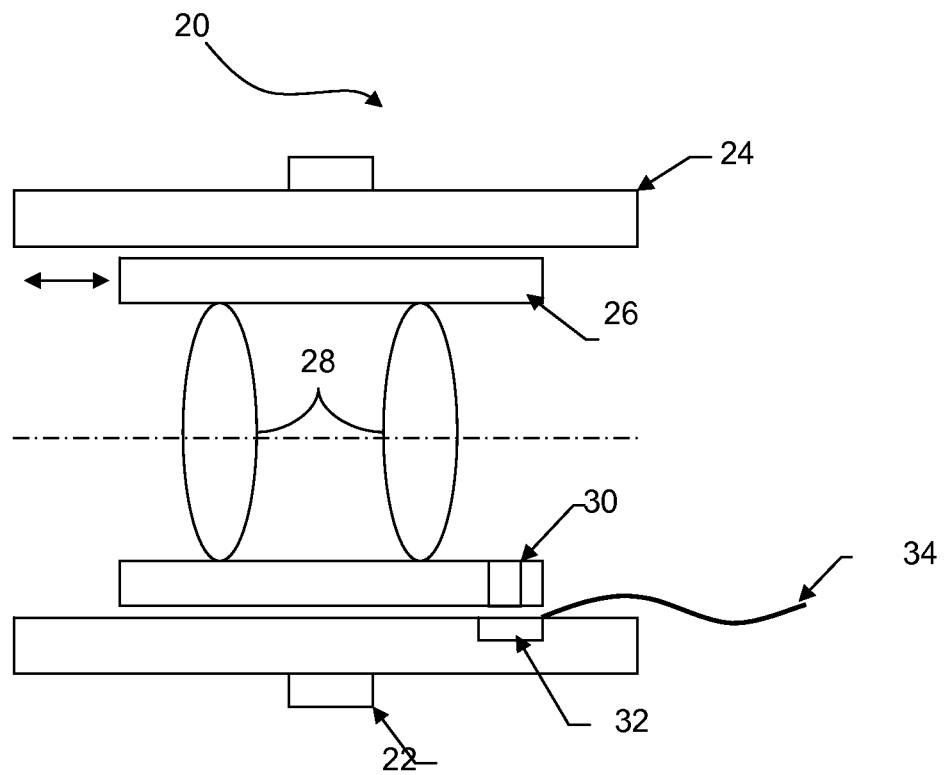
FIG. 4 is a block diagram illustrating a camera focus block with position sensor configured in accordance with one embodiment of the present invention.

In one embodiment illustrated in FIG. 4, range sensing information is obtained by a lens mount on one camera 20. A stationary lens mount 24 is provided wherein a lens cell 26 is slideably mounted. At least one lens 28 is disposed within the lens cell 26. Coupled to said lens cell 26 is a magnet 30. The magnet 30 is disposed proximal to a Hall sensor 32 disposed in, or upon an interior wall of said lens mount 24. The Hall sensor 32 is coupled to processing circuitry via a flex cable 34. A focus ring 22 adjusts the position of the lens cell 26 relative to the lens mount 24 and the Hall sensor 24 disposed therein.

As illustrated in FIGS. 5A and 5B, the magnet 30 can be disposed in either an orientation where the polar axis is perpendicular to the lens mount 24, as in FIG. 5A, or where its axis is parallel to the lens mount 24, as in FIG. 5B. In the former orientation of Fig. A, the response of the Hall sensor 32 is narrow, but intense, while that of the orientation of FIG. 5B is broader, but requires a sensor 32 with higher sensitivity. As illustrated in FIG. 5A the output of the Hall sensor 32 along one slope of the response curve changes from maximum to minimum over a short distance (about half the width of the magnet). This results in a sensor configuration that provides a sensitive measure of lens motion over a short working distance.

In contrast, in FIG. 5B, the orientation of the magnet has been rotated 90 degrees relative to that of FIG. 5A. The monotonic portion of the response curve now extends across the length of the magnet. That is, the Hall sensor 32 can traverse a longer distance and still output an unambiguous signal. Because the slope of the response curve is flatter, the FIG. 5B configuration has a longer working range than that of FIG. 5A, but is less sensitive to changes in position.

Figure 6A:
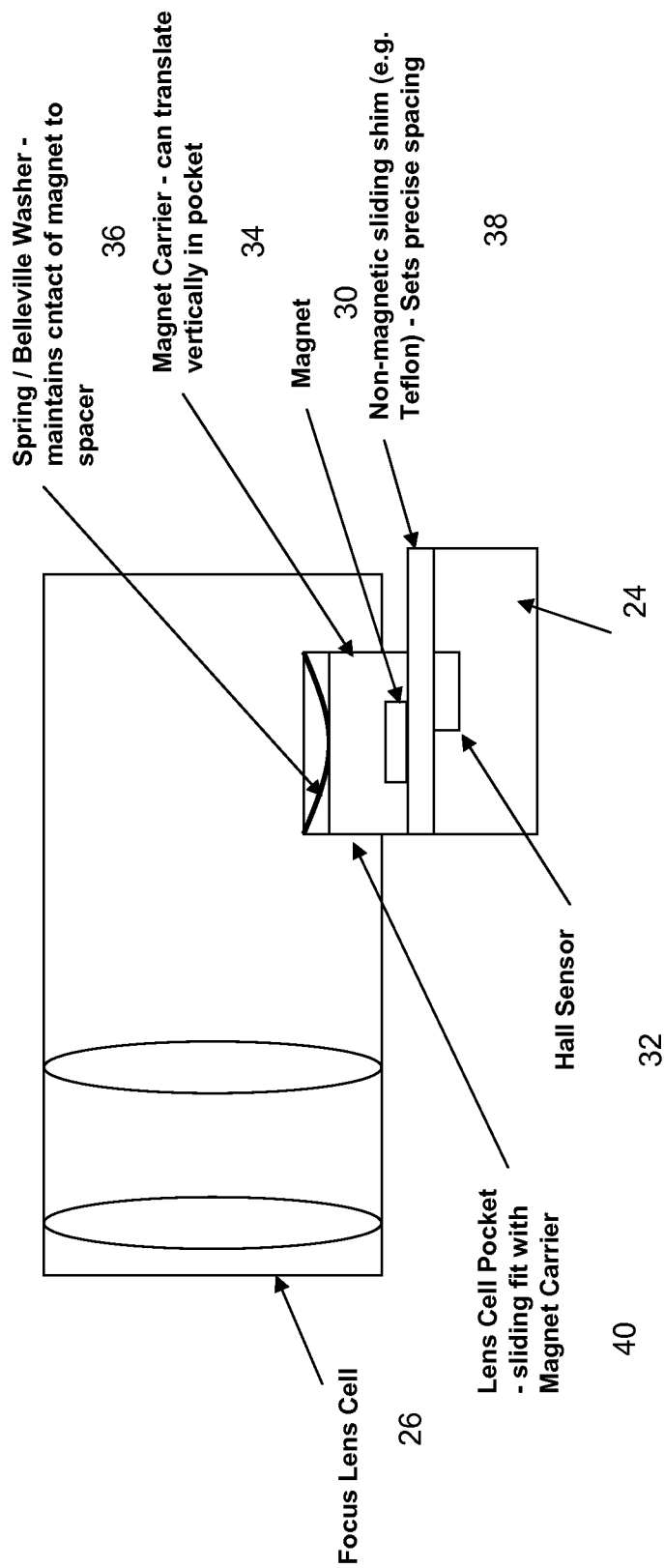
FIG. 6A is a block diagram illustrating a camera focus block with magnet disposed on a spring guide configured in accordance with one embodiment of the present invention.
Figure 6:
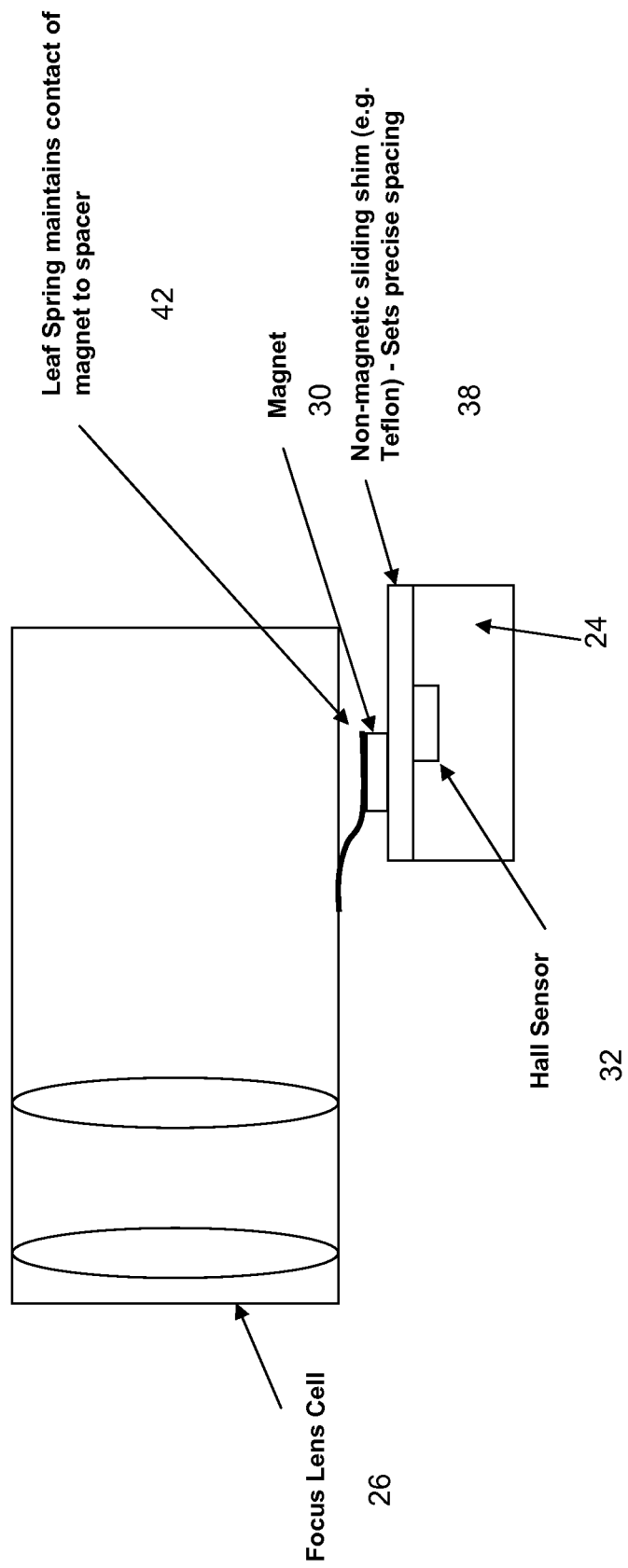
FIG. 6B is a block diagram illustrating a camera focus block with magnet disposed on an unrecessed spring guide configured in accordance with one embodiment of the present invention.
FIG. 6C is a block diagram illustrating a camera focus block with magnet disposed on an unrecessed leaf spring guide configured in accordance with one embodiment of the present invention.

As illustrated in FIGS. 6A-6C, a variety of mechanical embodiments may be provided wherein such a Hall sensor based design may be implemented. In one such embodiment, as illustrated in FIG. 6A, the magnet 30 is disposed in a magnet carrier 34 itself coupled to the lens cell 26 via a spring or Belleville washer 36. This allows the magnet 30 to slide along a non-metallic shim or track 38 designed to insure uniform separation between the magnet 30 and the Hall sensor 32. In FIG. 6B, an alternative embodiment is illustrated wherein the magnet 30 is mounted directly on the spring or the Belleville washer 36. Such an embodiment does not require the recessing of a magnet holder into the lens cell 26 while still maintaining a precise spacing between the magnet 30 and the sensor 32. In an alternative embodiment of the present invention illustrated in FIG. 6C, a leaf spring 42 is used in a configuration similar to that of FIG. 6 B.

Figure 7:
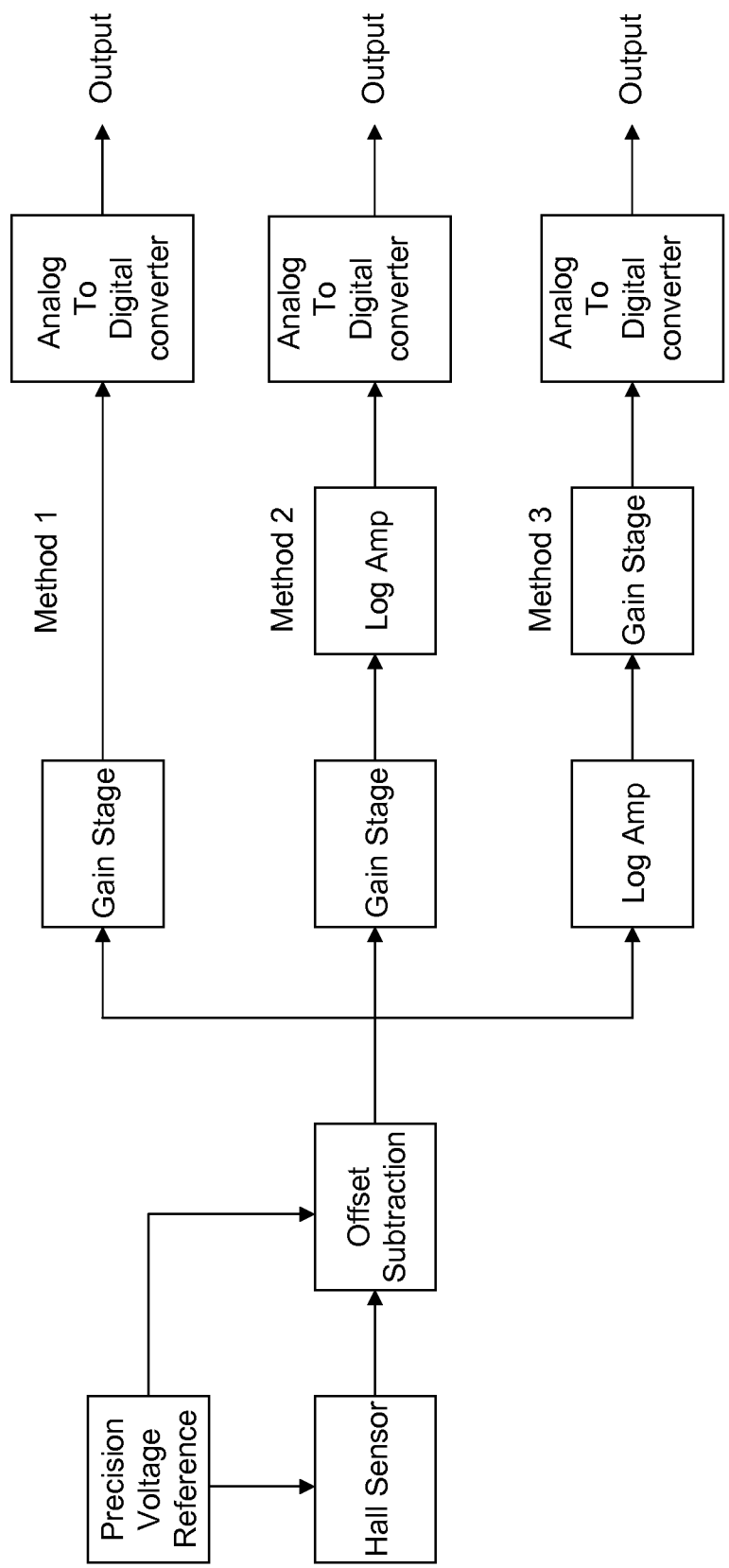
FIG. 7 is a block diagram illustrating three approaches to processing the raw signal from a Hall sensor configured in accordance with one embodiment of the present invention.

As illustrated in FIG. 7, a block diagram illustrating three different approaches to processing the raw signal from a Hall sensor. The signal from the Hall Sensor first has an offset subtracted from it. This may be required in some cases since some Hall sensors introduce an inherent offset in their output signal. Subtracting any offset first allows only the change in signal to be presented to the gain stage. The gain can be maximized since any offset has been subtracted. This is not unlike trying to measure small temperature variations of a hot object. It would be desirable to first subtract the average temperature of the hot object from the temperature readings, and then amplify only the change in temperature about the average. This results in a more precise measurement.

Methods 2 and 3 of FIG. 7 generally introduce a non-linear gain (log amplifier) into the signal conditioning path to compensate for the non-linear relationship between Hall sensor output and the range at which the lens is focused.

Figure 8:
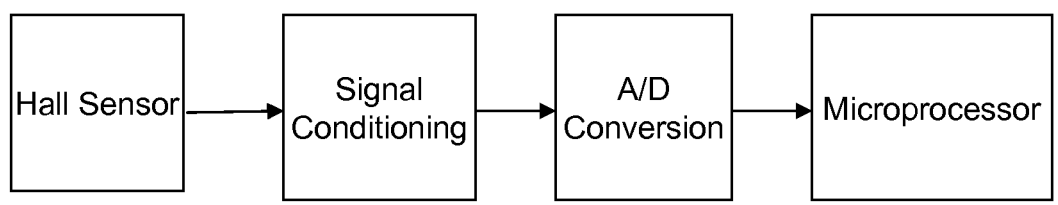
FIG. 8 is a block diagram illustrating a Hall sensor used to extract rage data from the focus mechanism of a camera for use in determining an image parallax, and correcting therefore configured according to one embodiment of the present invention.

FIG. 8 is a functional block diagram of one embodiment of the present invention wherein a Hall sensor is used to extract rage data from the focus mechanism of a camera for use in determining a image parallax, and correcting therefore. In such an embodiment, the analog output signal from the Hall sensor is first applied to a signal conditioning block. Signal conditioning may consist of any of a multitude of processing functions including offset subtraction, filtering, linearization and amplification depending on the specific embodiment. The output from the signal conditioning block is presented to the input of an A/D converter whereby the signal is digitized and converted to a numeric format suitable for digital data acquisition. This data is then acquired by a microprocessor or other data acquisition system for subsequent use.

Figure 10:
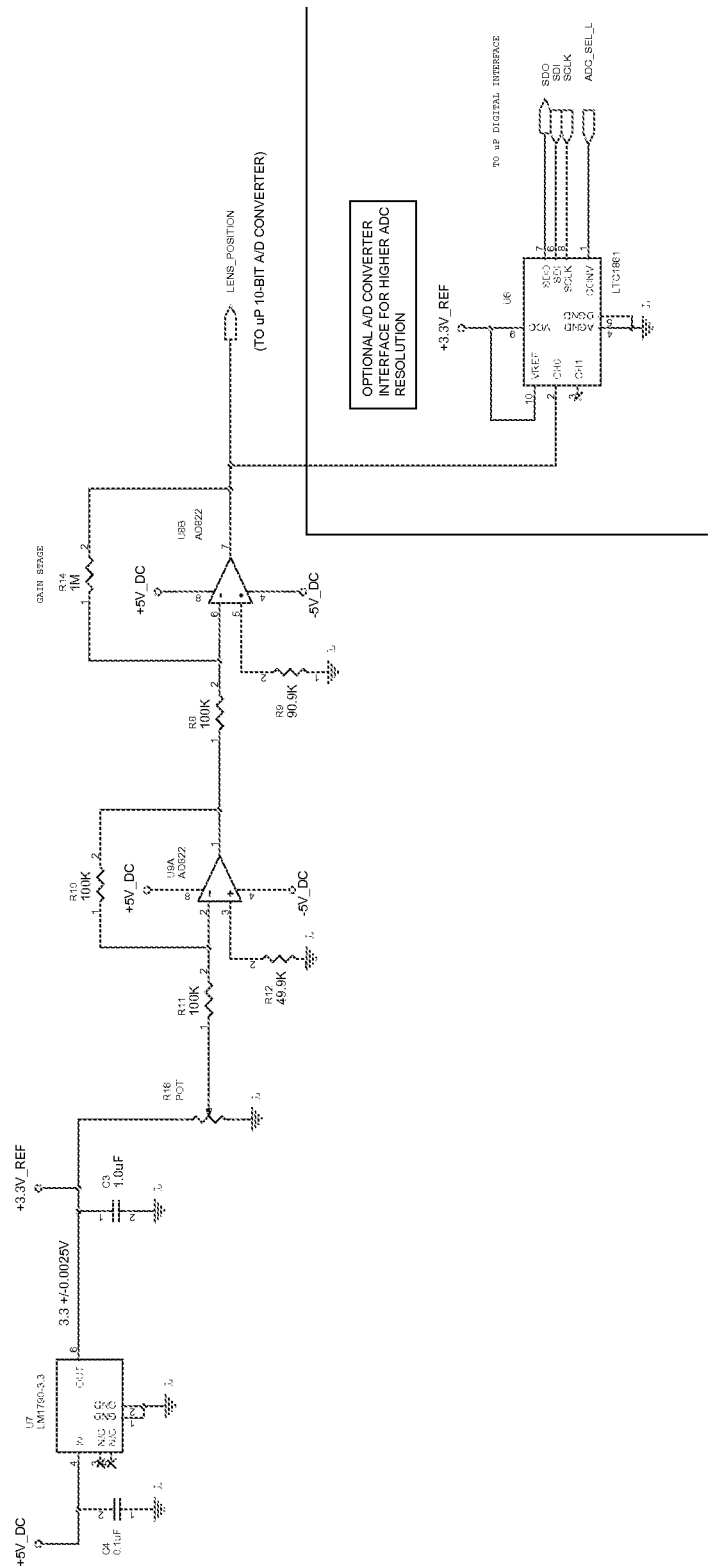
FIG. 10 is an electrical diagram illustrating implementation of potentiometers for use in a camera focus adjustment configured in accordance with one embodiment of the present invention.

In another embodiment, a position sensor such as a potentiometer, illustrated in FIGS. 9 and 10, or similar sensor (e.g. rotary encoder) is affixed to the focus control to provide a continuously variable representation of focus control position, which is directly related to the actual lens position relative to the focal plane, to the processing electronics. A continuously adjustable input allows for a continually variable vergence adjustment. That is, optimal image registration is achieved across the full range of focus and at all intermediate positions. Use of switches, in contrast, would achieve optimum registration only at the focus positions indicated by the switches.

In another embodiment, an auto-focus mechanism is employed on the optical system. This system maintains focus by sensing range to the object (active autofocus) or by evaluating some aspect of the acquired imagery (passive autofocus) to establish how to adjust the lens position to maintain focus. The signal used to adjust lens position is representative of the range to the object and thus can be used as the range estimate input to the image processing electronics. Vergence across the focus range can be achieved by shifting one image relative to another based on this lens position signal.

Figure 11:
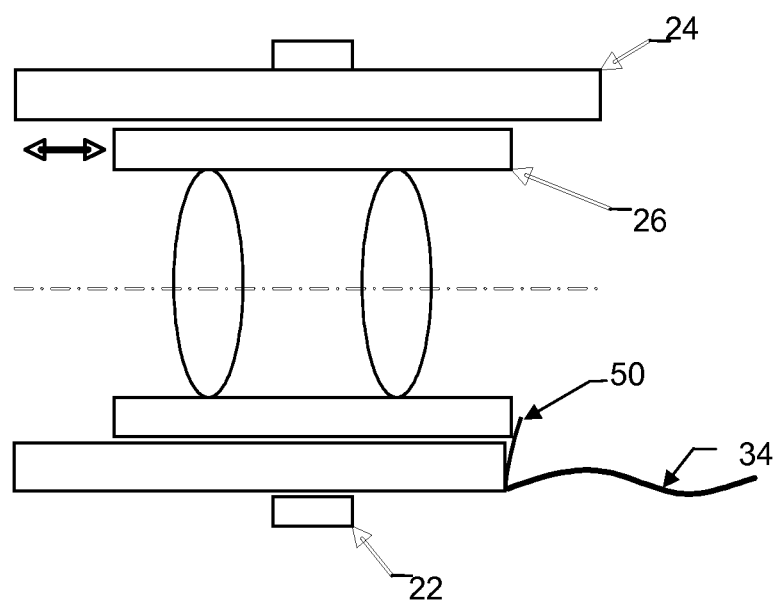
FIG. 11A is a block diagram illustrating a camera focus block with a strain gage position sensor configured in accordance with one embodiment of the present invention.
FIG. 11B is a block diagram illustrating a strain gage position sensor configured in accordance with one embodiment of the present invention.
Figure 11:
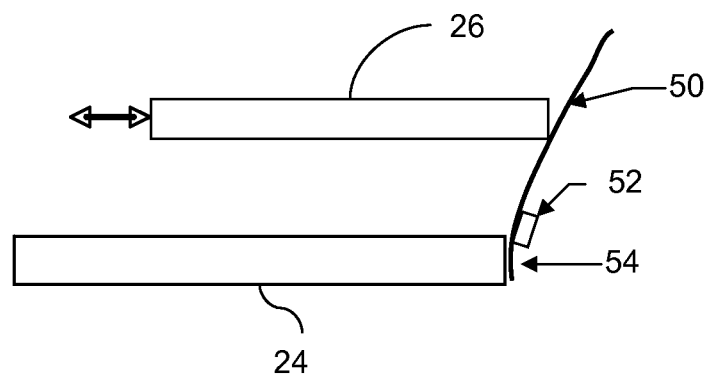

In an alternative embodiment of present invention, illustrated in FIG. 11A, the position of a lens cell 26 relative to a lens housing 24 is obtained through the use of a spring 50 and associated tension meter. The strain gage or other tension meter 50 is illustrated in more detail in FIG. 11B. In this embodiment, a spring 50, such as a leaf spring, is provided upon which is disposed a strain gage 52. The spring 50 is attached at one end 54 to the lens mount 24, and at the other is disposed in contact with the lens cell 26 such that movement of the lens cell 26 relative to the lens mount 24 will change the strain on the spring 50, which is then measured by the strain gage 52.

In each of the previous embodiments, the optics are focused and in that process the amount of image shift to be introduced to achieve vergence has been determined. In a variation of this idea, the amount of image shift can be used instead as a means to adjust the focus. That is, as the range to an object changes, image separation due to parallax will tend to occur more quickly than the object will go out of focus. In this case, image separation is a more sensitive indication of range than focus. Thus, adjusting the focus ring of an optical system to achieve Vergence will result in the system also coming into focus, and elimination of image separation by adjusting the focus ring may be the primary means to achieving a focused image. This is in contrast to the previous discussion whereby the focus ring is primarily adjusted to achieve focus, and the images come into align as a result.

In portable cameras, power consumption is of great concern as high power must be supplied with larger, heavier batteries or power generators. To further reduce power consumption when employing the aforementioned position sensor, in one embodiment, the position sensor could be normally powered off, and turned on only when necessary to make a reading. This would occur periodically at some nominally low sample rate. The current sensor reading would be compared to the previous reading. If the current reading differs from the previous reading, this would be an indication of a change in focus. The sensor sampling rate (frequency of reading the sensor) would be increased temporarily on the presumption that the user is actively adjusting the control. If after some period of time no further change in sensor reading is detected, the rate of sensor reading would drop back to the nominal low frequency.

Motion to or away from imagers can result in changes to the amount of vertical offset over time. In one embodiment of the present invention, provision may be made to compensate for this velocity induced misregistration. From a plurality of data points including known range, pixel row misregistration, and camera spacing, the velocity necessary to create the pixel row misregistration may be calculated. Thus for instances where a known velocity is ascertainable, pixel row misregistration may be obtained by comparison to the calculated misregistrations of that known velocity, and appropriate correction made.

EXAMPLES

Ranging and GPS Coordinate Extraction

As illustrated in FIG. 1, the amount of image offset to be introduced into an acquired image to achieve pixel correspondence to imagery acquired from another camera can be determined if the separation distance between the cameras and the range the object is known. Since the separation distance is typically fixed by the specific geometry of the system, and an indication of range developed from focus control or lens position, the amount of image offset can be uniquely determined. This approach avoids reliance on complex image processing techniques to achieve this result, with an attendant reduction in associated power consumption. In addition, the need for a separate vergence adjustment control is eliminated, simplifying the user interface.

An extension of this concept can be used to derive Global Positioning System (GPS) coordinates of objects in the field of view based on the amount of parallax-induced image offset observed between corresponding objects in the two images and knowledge of the global location of the camera system and the direction in which it is pointing.

Parallax-induced image offsets can be used to establish range to each object in the field of view. If the location of each camera and the direction that each is pointing are known in a global frame of reference, and the baseline distance separating the cameras is also known, the range to each object in the field-of-view and the location of each object in a global frame of reference can be established.

In particular, if the GPS coordinates of the camera system and the line of sight angle (compass heading) at which the camera system is pointing are known, GPS coordinates of every object in the camera system field of view can be established based on knowledge of the geometry of the camera system and the calculated range to an object based on parallax-induced image offset as discussed previously.

The direction that the cameras are pointing in a global reference frame establishes a global line of sight of each camera and establishes the vector direction of the camera optical axis. In the image, the offset between the center of the field of view and the object location in the field of view can be used to establish a line of sight vector to the object in the global coordinate frame. Range information to the object can be determined by the amount of parallax error as discussed previously.

GPS coordinates of the cameras establish their absolute location in a global reference frame. The line of sight vector between the camera and the object establishes the direction of the object relative to the camera. The range to the object establishes the distance of the object relative to the camera. Since the location of the camera, the direction to the object and the distance to the object are all known, the GPS coordinates of the object can be determined.

In essence, the GPS coordinates of objects in the field of view of the cameras can be determined simply by looking at them. It is anticipated that this capability would have broad application in a wide range of surveillance, reconnaissance and targeting applications.

Parallax error between cameras results in a certain amount of offset in images acquired from the cameras. This offset is range dependent. The lines of sight of the cameras can be aligned to intersect at a particular range, which eliminates image offset at that range only. In general, the amount of image separation expected between cameras is based on the physical separation distance between them.

The focus control on a camera can be used as an indication of the range to an object, since optimum focus is achieved at a unique point based on the range. Alternatively, directly sensing the lens position relative to the focal plane provides this indication.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for the vergence of images from a plurality of cameras, the system comprising:
   a first camera;
   a second camera disposed at some distance from said first camera;
   a parallax adjustment whereby the position of a lens of said first camera can be adjusted by a user;
   a single lens position sensor at least a portion of which is in a fixed position relative to said lens along an optical axis of said lens whereby the position of said lens relative to the focal plane is directly measured;
   a comparator whereby said position of said lens relative to the focal plane is compared to known relationships between lens position and image shift and providing vergence data corresponding to said lens position and;
   a processor whereby said images generated by said first camera are superimposed on said images generated by said second camera and aligned by said vergence data.

2. The system of claim 1 wherein said focus adjustment comprises a focus dial whereby distance between a lens and a focal plane can be adjusted.

3. The system according to claim 2 wherein said lens is disposed in a lens block slideably disposed within a lens housing.

4. The system according to claim 3 wherein said lens housing comprises a position sensor mounted within said housing proximate to said lens block.

5. The system according to claim 4 further comprising a magnet coupled to said lens block and wherein said position sensor is a Hall sensor.

6. The system according to claim 4 wherein said position sensor is a spring upon which a tension sensor is disposed.

7. The system according to claim 4 wherein said position sensor is a potentiometer.

8. The system according to claim 2 wherein said focus dial is provided with a potentiometer such that a wipe of said potentiometer is disposed on said dial and a resistive element of said potentiometer being disposed proximate to said focus dial fixed to a housing of said first camera.

9. A method for the focus actuated vergence of a plurality of images, said method comprising:

measuring directly the distance from a lens of a first camera to a focal plane with a single sensor at least a portion of which is in a fixed position relative to said lens along an optical axis of said lens;

comparing said distance from said lens of said first camera to said focal plane to a lookup table for image parallax data for a plurality of said distances from said lens of said first camera to said focal plane;

using said image parallax data from said lookup chart to compensate for parallax error in superposition of images generated by said first camera and a second camera.

10. The method according to claim 9 further comprising compensating for velocity induced misregistration.

11. The method according to claim 9 wherein said position of said lens block is directly measured by a Hall sensor and magnet pair.

12. The method according to claim 9 wherein said position of said lens block is determined by a reading of a potentiometer disposed in said lens housing.

13. The method according to claim 9 wherein said position of said lens block is determined by a tension meter disposed on a spring disposed between said lens block and a wall of said lens housing.

* * * * *